(12) United States Patent
Marudi et al.

(10) Patent No.: US 11,036,518 B1
(45) Date of Patent: Jun. 15, 2021

(54) AUTOMATED MANAGEMENT OF SCHEDULING A COMPUTER HARDWARE REBOOT

(71) Applicant: FMR LLC, Boston, MA (US)

(72) Inventors: Ashwini Marudi, Bangalore (IN); Syed Muzamil, Bengaluru (IN); Haya Liza Korah, Kerala (IN); Pavithra Venkatesh, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/182,277

(22) Filed: Feb. 23, 2021

(51) Int. Cl.
  *G06F 9/44* (2018.01)
  *G06F 9/4401* (2018.01)
  *G06F 9/48* (2006.01)
  *G06F 9/451* (2018.01)
  *G06F 8/65* (2018.01)

(52) U.S. Cl.
  CPC ............ *G06F 9/4401* (2013.01); *G06F 9/452* (2018.02); *G06F 9/4887* (2013.01); *G06F 8/65* (2013.01)

(58) Field of Classification Search
  CPC ........................................................ G06F 9/44
  See application file for complete search history.

(56) References Cited

U.S. PATENT DOCUMENTS

| | | | |
|---|---|---|---|
| 8,234,486 B2 | 7/2012 | Bernardini et al. | |
| 9,239,666 B2 | 1/2016 | Treder et al. | |
| 9,471,331 B2 | 10/2016 | Kludy et al. | |
| 9,703,544 B1 | 7/2017 | Feeser | |
| 9,880,854 B1 | 1/2018 | Myers et al. | |
| 10,147,115 B1 | 12/2018 | Bidarkar et al. | |
| 2008/0263347 A1 | 10/2008 | Chen | |
| 2012/0072898 A1* | 3/2012 | Pappas | G06F 21/10 717/171 |
| 2014/0289639 A1* | 9/2014 | Halim | G06F 9/452 715/740 |

(Continued)

OTHER PUBLICATIONS

"Prevent local computer rebooting (windows update) during fullscreen remote desktop session," dated Jun. 27, 2014, available at https://superuser.com/questions/774026/prevent-local-computer-rebooting-windows-update-during-fullscreen-remote-deskt, 2 pages.

(Continued)

*Primary Examiner* — Jae U Jeon
(74) *Attorney, Agent, or Firm* — Proskauer Rose LLP (57) ABSTRACT

Methods and apparatuses are described for automated management of scheduling a computer hardware reboot. A computing device detects a user login request. The computing device launches a hosted virtual desktop application for display on a display device coupled to the computing device. The computing device determines that a reboot of the computing device is required, including identifying that one or more software application updates have been applied to the computing device during a period of time prior to detecting the user login request. The computing device generates a reboot notification window that is displayed on top of the hosted virtual desktop application. The computing device receives instructions via the reboot notification window to execute a scheduled reboot of the computing device. The computing device executes the scheduled reboot of the computing device at a time defined in the received instructions.

28 Claims, 6 Drawing Sheets

(56) References Cited

U.S. PATENT DOCUMENTS

2018/0157557 A1* 6/2018 Puustinen .................. G06F 8/65
2021/0092241 A1* 3/2021 Yoshida ................ H04L 67/125

OTHER PUBLICATIONS

"Features in Configuration Manager technical preview version 1902," dated Feb. 8, 2019, available at https://docs.microsoft.com/en-us/mem/configmgr/core/get-started/2019/technical-preview-1902, 5 pages.

* cited by examiner

AUTOMATED MANAGEMENT OF SCHEDULING A COMPUTER HARDWARE REBOOT

TECHNICAL FIELD

This application relates generally to methods and apparatuses, including computer program products, for automated management of scheduling a computer hardware reboot.

BACKGROUND

As enterprises shift toward cloud-based computing infrastructures, the utilization of hosted virtual desktop (HVD) applications executing on a network of distributed clients (i.e., desktop computing devices and/or laptop computing devices) has increased. Generally, a hosted virtual desktop application provides to an end user the experience of using a client computing device (i.e., the look and feel is almost identical to a traditional 'desktop' interface), but the applications and data provides by the HVD application is stored in and served from a cloud computing infrastructure that is remote from the client computing device. In this way, a plurality of users can access a customized HVD application from a client workstation and the enterprise can manage the client workstations from a central source.

In some instances, the HVD for each user can exist as a container or virtual machine (VM) on a cloud computing device. When a user logs into the client computing device and executes a HVD application, the client computing device connects to the cloud infrastructure to retrieve the applications and functionality from one or more server computing devices for display to the user. Exemplary HVD applications include, but are not limited to, Amazon® WorkSpaces™ available from Amazon, Inc., Windows® Virtual Desktop from Microsoft, Inc., VMware Horizon™ available from IBM, Inc., and Citrix Workspace™ available from Citrix, Inc.

In many cases, the user interface window for the HVD application covers an entire viewing area of the 'desktop' screen of the underlying operating system on the client computing device and often the user cannot resize or minimize the HVD application window. As a result, important messages such as notification windows generated by the client device's operating system software are not visible to a user of the client computing device. In some instances, these notification windows relate to critical operational functions of the client computing device—such as informing the user that the client device must be rebooted.

Figure 1:
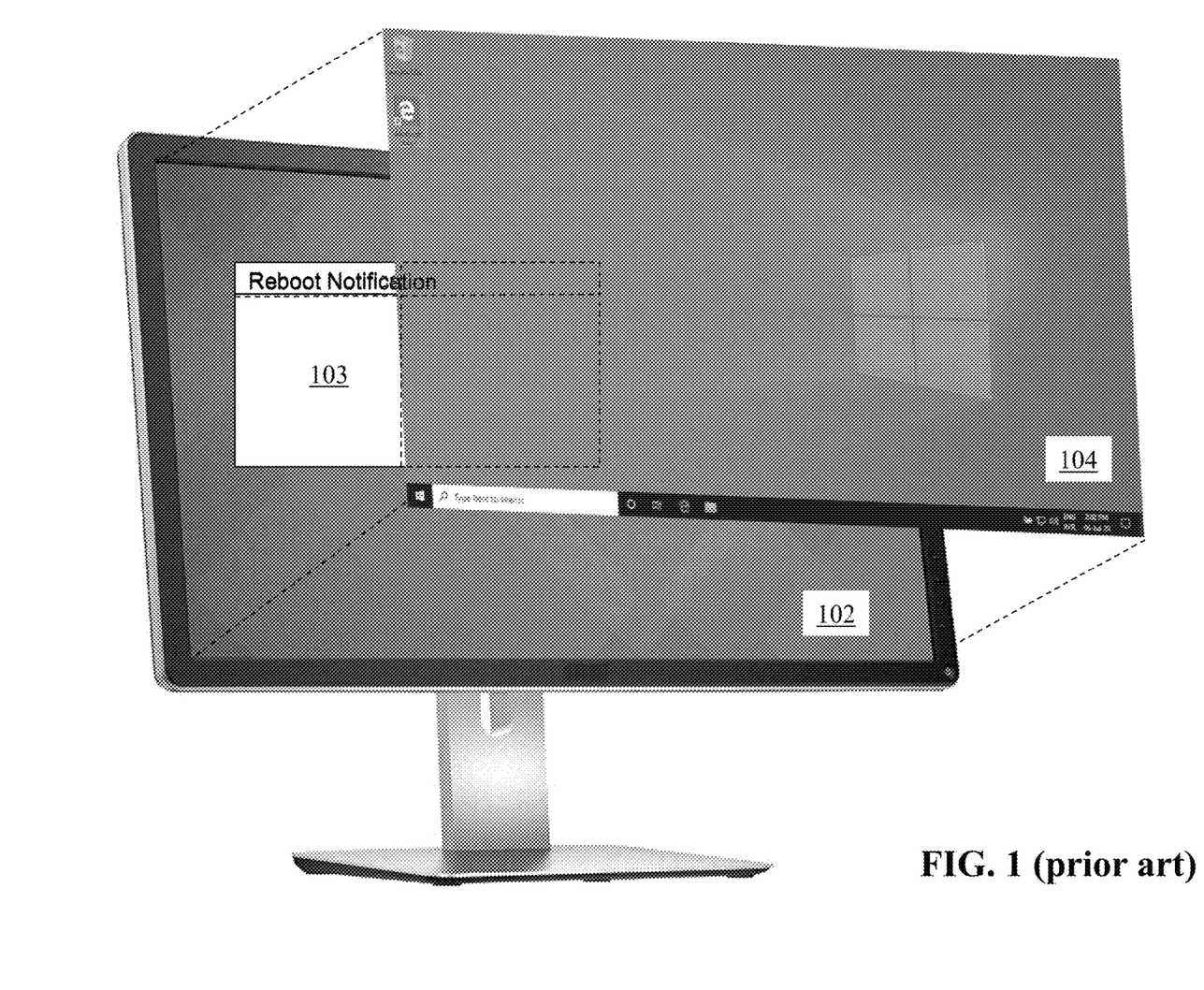
FIG. 1 is a diagram of an existing reboot notification window hidden underneath a hosted virtual desktop application.

Upon detecting that a reboot is pending or required, operating systems typically schedule a hardware reboot to occur automatically absent user intervention. For example, an operating system may schedule a hardware reboot to occur within a short time (e.g., five minutes) of detecting that the reboot is needed. In another example, an operating system may schedule a hardware reboot to occur at a predetermined time each day (e.g., 10:30 am). In either case, the operating system software may generate a notification window to inform the user that the reboot is scheduled. The notification window can prompt the user to either confirm that the computing device can proceed with the reboot, reschedule the reboot for a more convenient time (e.g., by delaying the reboot or providing a specific time for the reboot to occur), or cancel the reboot. FIG. 1 is a diagram of an existing reboot notification window 103 displayed by operating system software 102, where the reboot notification window 103 is hidden underneath a hosted virtual desktop application 104. As shown in FIG. 1, the dashed lines of the reboot notification window 103 indicate that the reboot notification window is hidden underneath the HVD application 104—because the HVD application window covers the entire screen, it should be appreciated that the entire reboot notification window is hidden during normal use. Therefore, the user is unable to see the reboot notification window 103 when it appears.

As noted above, however, during a HVD application session, the user cannot see the reboot notification window generated by the operating system software. Therefore, the user does not have the opportunity to adjust or cancel execution of the pending reboot, and the client computing device simply reboots at the scheduled time—which causes the computing device to shut down and restart. When an unexpected reboot occurs while the user is in the midst of working in specific documents or applications, it can cause the loss of documents, work progress, and other data. In addition, the user experience is diminished due to the unforeseen interruption in availability of the computing device.

SUMMARY

Therefore, methods and systems are needed for management of scheduling a computer hardware reboot to overcome the aforementioned problems. The methods and systems described herein advantageously provide for a robust, user-friendly process to automatically detect that a computer hardware reboot is pending or required, and to generate a reboot notification window that appears on top of an existing HVD application window (in contrast to functionality available in existing operating system software)—so that the user can easily view the status of the scheduled reboot and make changes to the schedule as appropriate. As a result, the computing device can reboot at a time that is more convenient for the user (e.g., when the user is not using the device) so that the user does not experience an undesired interruption in use of the client computing device.

The invention, in one aspect, features a system for automated management of scheduling a computer hardware reboot. The system includes a computing device having a memory that stores computer-executable instructions and a processor that executes the computer-executable instructions. The computing device detects a user login request. The computing device launches a hosted virtual desktop application for display on a display device coupled to the computing device. The computing device determines that a reboot of the computing device is required, including identifying that one or more software application updates have been applied to the computing device during a period of time prior to detecting the user login request. The computing device generates a reboot notification window that is displayed on top of the hosted virtual desktop application. The computing device receives instructions via the reboot notification window to execute a scheduled reboot of the computing device. The computing device executes the scheduled reboot of the computing device at a time defined in the received instructions.

The invention, in another aspect, features a computerized method of automated management of scheduling a computer hardware reboot. A computing device detects a user login request. The computing device launches a hosted virtual desktop application for display on a display device coupled to the computing device. The computing device determines that a reboot of the computing device is required, including identifying that one or more software application updates have been applied to the computing device during a period of time prior to detecting the user login request. The computing device generates a reboot notification window that is displayed on top of the hosted virtual desktop application. The computing device receives instructions via the reboot notification window to execute a scheduled reboot of the computing device. The computing device executes the scheduled reboot of the computing device at a time defined in the received instructions.

Any of the above aspects can include one or more of the following features. In some embodiments, the hosted virtual desktop application covers an entire viewing area of the display device. In some embodiments, other notification windows generated by the computing device are covered by the hosted virtual desktop application, such that the other notification windows are not visible to a user of the computing device.

In some embodiments, the computing device analyzes one or more registry keys of an operating system of the computing device to identify that one or more software application updates have been applied to the computing device during a period of time prior to detection of the user login request. In some embodiments, the computing device analyzes one or more operating system management instrumentation classes of an operating system of the computing device to identify that one or more software application updates have been applied to the computing device during a period of time prior to detection of the user login request.

In some embodiments, the reboot notification window comprises one or more user interface (UI) input controls that enable a user of the computing device to select a scheduled reboot time of the computing device. In some embodiments, each of the one or more UI input controls is associated with a different scheduled reboot time. In some embodiments, receiving instructions via the reboot notification window to execute a scheduled reboot of the computing device comprises detecting a selection of one of the UI input controls by a user of the computing device. In some embodiments, the reboot notification window comprises a countdown timer that begins counting when the reboot notification window is first generated. In some embodiments, when the countdown timer reaches zero and a selection of one of the UI input controls is not detected, the computing device executes a reboot of the computing device at a predetermined time. In some embodiments, the predetermined time is immediately after the countdown timer reaches zero. In some embodiments, the predetermined time is at least thirty minutes after the countdown timer reaches zero.

In some embodiments, the computing device generates the reboot notification window within a predetermined time period after detecting the user login request. In some embodiments, the reboot notification window is always visible to a user of the computing device until the instructions to execute a scheduled reboot of the computing device are received.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 2:
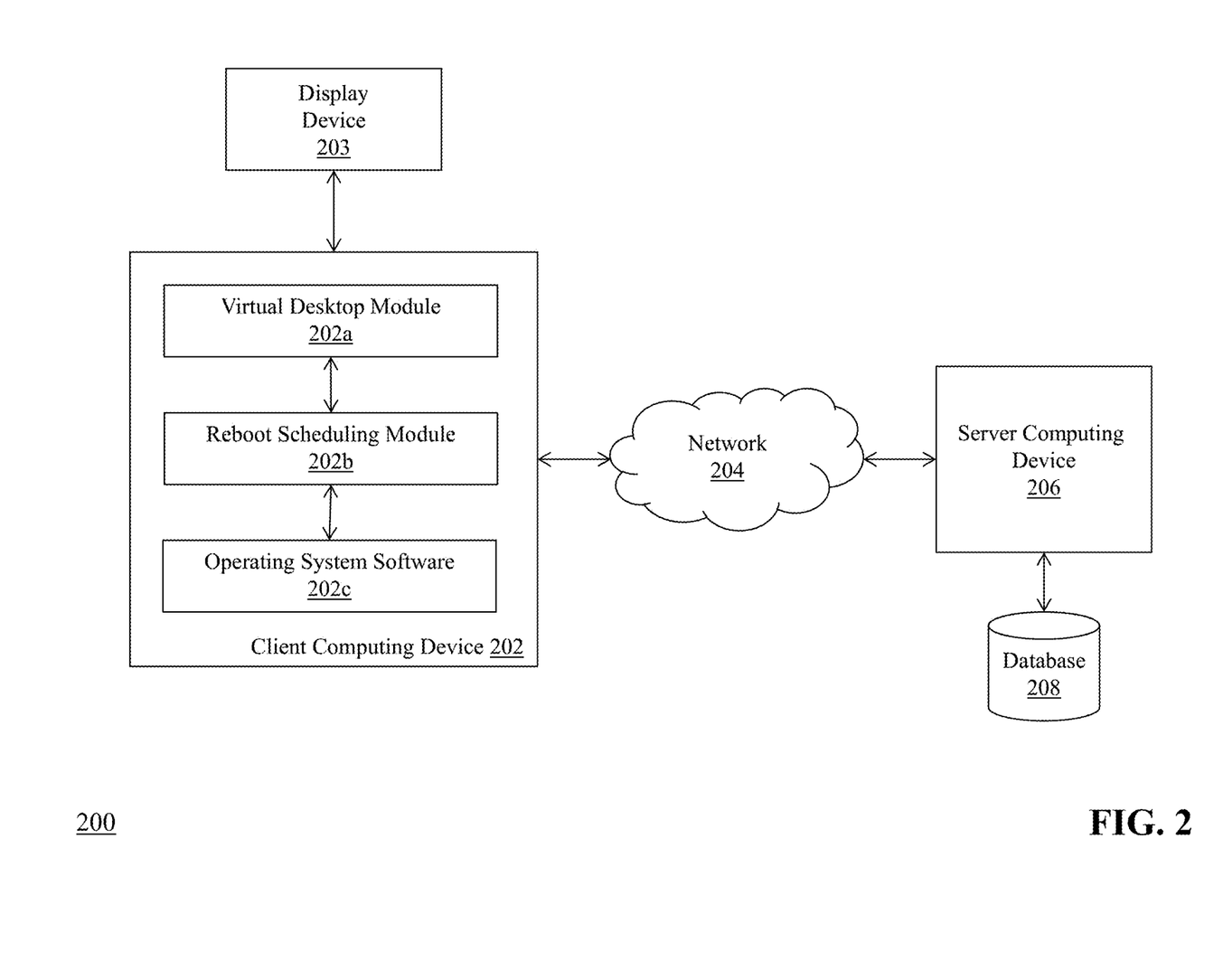
FIG. 2 is a block diagram of a system for automated management of scheduling a computer hardware reboot.

FIG. 2 is a block diagram of a system 200 for automated management of scheduling a computer hardware reboot. The system 200 includes a client computing device 202 with a virtual desktop module 202a, a reboot scheduling module 202b, and operating system software 202c, a display device 203 coupled to the client computing device 202, a communications network 204, a server computing device 206 and a database 208.

The client computing device 202 uses software and circuitry (e.g., processor, memory) to execute applications, such as the virtual desktop module 202a, the reboot scheduling module 202b, and the operating system software 202c and to communicate with the server computing device 206 via the communication network 204 (e.g., using software installed on the device to connect to the Internet via communication circuitry, such as a network interface card or WiFi antenna) for the purposes of automated management of scheduling a computer hardware reboot as described herein. Example client computing devices 202 can include, but are not limited to, a desktop computer, laptop computer, or other similar types of computing devices. Although FIG. 2 includes a single client computing device 202, it should be appreciated that the system 200 can include any number of client computing devices associated with one or more users.

As mentioned above, the client computing device 202 includes a virtual desktop module 202a, a reboot scheduling module 202b, and operating system software 202c. The client computing device 202 is further coupled to a display device 203 for the presentation of graphical user interfaces and related visual elements to a user of the client computing device 202. As can be appreciated, in some embodiments the display device 203 is a separate device (e.g., a monitor or screen that is connected to the client computing device 202 via a physical cable), while in other embodiments the display device 203 is embedded into the client computing device 202 (e.g., a monitor/laptop screen).

The virtual desktop module 202a is executed by the client computing device 202 to display a hosted virtual desktop (HVD) application on the display device 203 to a user of the client computing device 202. Generally, a hosted virtual desktop application executes locally on the client computing device 202 and connects to other applications and data (e.g., user-specific applications or functionality) that are stored on and/or made available by the server computing device 206.

In some instances, each hosted virtual desktop exists as a container or virtual machine (VM) on the server computing device 206 and when the virtual desktop module 202*a* executes the HVD application, the client computing device 202 accesses certain applications and functionality from the server computing device 206 for display on the display device 203. To a user of client computing device 202, the experience of using a HVD application should be largely indistinguishable from directly using applications and data installed locally on the client computing device 202. Exemplary HVD applications include, but are not limited to, Amazon® WorkSpaces™ available from Amazon, Inc., Windows® Virtual Desktop from Microsoft, Inc., VMware Horizon™ available from IBM, Inc., and Citrix Workspace™ available from Citrix, Inc.

The reboot scheduling module 202*b* is a software module installed on the client computing device 202. As will be described in detail below, the client computing device 202 executes the reboot scheduling module 202*b* to generate a reboot notification window for display to a user of client computing device 202, so that the user is aware that a reboot of the client computing device 202 is needed and the user can select a preferred time at which the reboot will take place—to avoid an unexpected or undesirable interruption of the computing device's availability. In some embodiments, the reboot scheduling module 202*b* is a PowerShell™-based application installed on operating system software 202*c* of client computing device 202. More information about the architecture and uses of PowerShell™ is provided at docs-.microsoft.com/en-us/powershell/scripting/overview?view=powershell-7.1, which is incorporated herein by reference.

The operating system software 202*c* is stored in local memory of the client computing device 202 and executed by a processor of the client computing device to support and manage the computing device's basic functions, such as processing instructions, scheduling tasks, executing applications, controlling peripherals, communicating with external networks and devices, responding to input provided by a user of the computing device, and so forth. In some embodiments, the operating system software 202*c* executes the reboot scheduling module 202*b* as a scheduled task for the purpose of automated management of scheduling a computer hardware reboot as described herein. Exemplary operating system software 202*c* includes, but is not limited to, Microsoft® Windows® available from Microsoft, Inc.

The communication network 204 enables components of the system 200 to communicate with each other using a packet-based protocol (e.g., IP). The network 204 may be a local network, such as a LAN, or a wide area network, such as the Internet. In some embodiments, the network 204 is comprised of several discrete networks and/or sub-networks (including related routing, load balancing, and traffic metering hardware).

The server computing device 206 is a combination of hardware and software modules that includes specialized hardware and/or software modules that execute on a processor and interact with memory modules of the server computing device 206, to receive data from the database 208, to transmit data to the database 208, and to communicate with the client computing device 202 in order to perform functions for automated management of scheduling a computer hardware reboot as described herein. As mentioned above, the server computing device 206 can provide certain virtual desktop functionality to the client computing device 202. The server computing device 206 can further provide software updates (e.g., operating system patches, security enhancements) to the client computing device 202 on a predetermined or customized schedule, so that the client computing device 202 can install the received software updates as appropriate to maintain a desired or required level of functionality. For example, an organization may want to ensure that certain local client computing devices are up-to-date with the most recent operating system patches to avoid any risk of security vulnerability. Therefore, the organization can instruct the server computing device 206 to transmit operating system patches to each of the client computing devices for local installation.

The database 208 is a computing device (or in some embodiments, a set of computing devices) coupled to the server computing device 206 and is configured to receive, generate, and store specific segments of data relating to the process of automated management of scheduling a computer hardware reboot as described herein. In one example, the database 208 can store user profile information and/or user configuration information that is used by the server computing device 206 to initialize or customize the HVD application functionality for a particular end user. In some embodiments, all or a portion of the database 208 can be integrated with the server computing device 206 or be located on a separate computing device or devices. The database 208 can comprise one or more databases configured to store portions of data used by the other components of the system 208, as will be described in greater detail below. An exemplary database 208 is MySQL™ available from Oracle Corp. of Redwood City, Calif.

Figure 3:
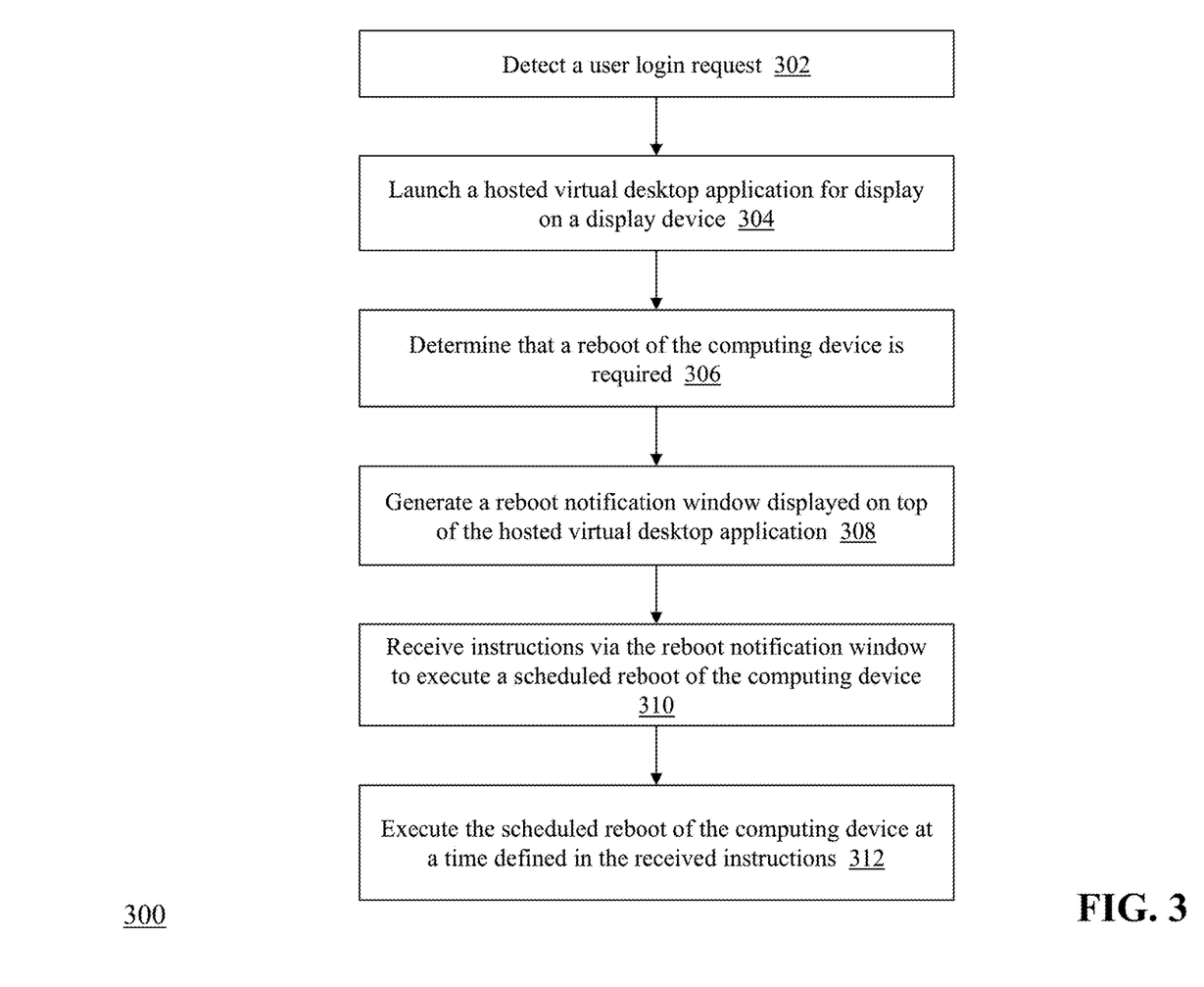
FIG. 3 is a flow diagram of a computerized method of automated management of scheduling a computer hardware reboot.

FIG. 3 is a flow diagram of a computerized method 200 of computerized method of automated management of scheduling a computer hardware reboot, using the system 200 of FIG. 2. The client computing device 202 detects (302) a user login request. For example, at the beginning of the work day, a user may enter access credentials (e.g., login ID, password) into an authentication window displayed by client computing device 202 in order to log into the device and access certain applications, such as a HVD application. The operating system software 202*c* of client computing device 202 can detect the user login request and configure the client computing device 202 to provide functionality specific to the user that is logging in.

As part of the initial login routine, the operating system software 202*c* can instruct the virtual desktop module 202*a* to launch (304) a HVD application for display on display device 203. For example, the virtual desktop module 202*a* can execute a HVD application stored locally on the client computing device 202 and connect to server computing device 206 to receive the applications and data that comprise the HVD that is specific to the user.

Also during the login routine, the operating system software 202*c* can further instruct the reboot scheduling module 202*b* to determine (306) that a reboot of the client computing device 202 is required. For example, during a time period prior to the user login request, the client computing device 202 may have received one or more software updates (e.g., patches, enhancements, configuration files, virus definitions) from one or more external sources, such as server computing device 206, and in order to effectuate the software updates, the client computing device 202 must be rebooted. In some embodiments, upon receiving the software updates, the operating system software 202*c* of client computing device 202 can modify a registry key to indicate or flag that a reboot of the computing device is required. For example, in the Microsoft® Windows® operating system, the following registry keys can exist to indicate that a reboot is needed to install software updates:

HKLM\Software\Windows\CurrentVersion\Component Based Servicing\ RebootPending
HKLM\Software\Windows\CurrentVersion\Windows Update\Auto Update\RebootRequired In order to determine whether the registry keys exist, the reboot scheduling module 202b can comprise a PowerShell™ application or script that executes a command to check the registry keys, as set forth in the following example commands:

Test-Path: 'HKLM\Software\Windows\CurrentVersion\Component Based Servicing/RebootPending'
Test-Path: 'HKLM\Software\Windows\CurrentVersion\WindowsUpdate\Auto Update\RebootRequired'

When the reboot scheduling module 202b returns 'true' to one or more of the above registry key check commands, the reboot scheduling module 202b can determine that a reboot is required.

In some embodiments, the reboot scheduling module 202b can determine whether a reboot is required by utilizing the Windows Management Instrumentation (WMI) functionality of PowerShell™ to check for WMI methods on the client computing device 202 that indicate a reboot is pending. For example, in system architectures that have Microsoft System Center Configuration Manager (SCCM) installed, the client computing device 202 may exhibit the following WMI method if a reboot is pending:

| Namespace | Class | Property | Value |
|---|---|---|---|
| ROOT\ccm\ClientSDK | CCM_ClientUtilities | DetermineifRebootPending | RebootPending |

In some embodiments, the reboot scheduling module 202b can execute a command to check the value of the above WMI methods (e.g., by determining if the ReturnValue is 0 and the method value is not null) to determine that a reboot of the client computing device 202 is pending. It should be appreciated that the above registry keys and WMI methods are exemplary, and that other types of registry keys and WMI methods may be used by the operating system software 202c and reboot scheduling module 202b to determine whether a reboot is needed. In addition, one of ordinary skill in the art would appreciate that other techniques in addition to, or instead of, evaluating registry keys and/or WMI methods exist to determine that a reboot of a computing device is pending.

Figure 4:
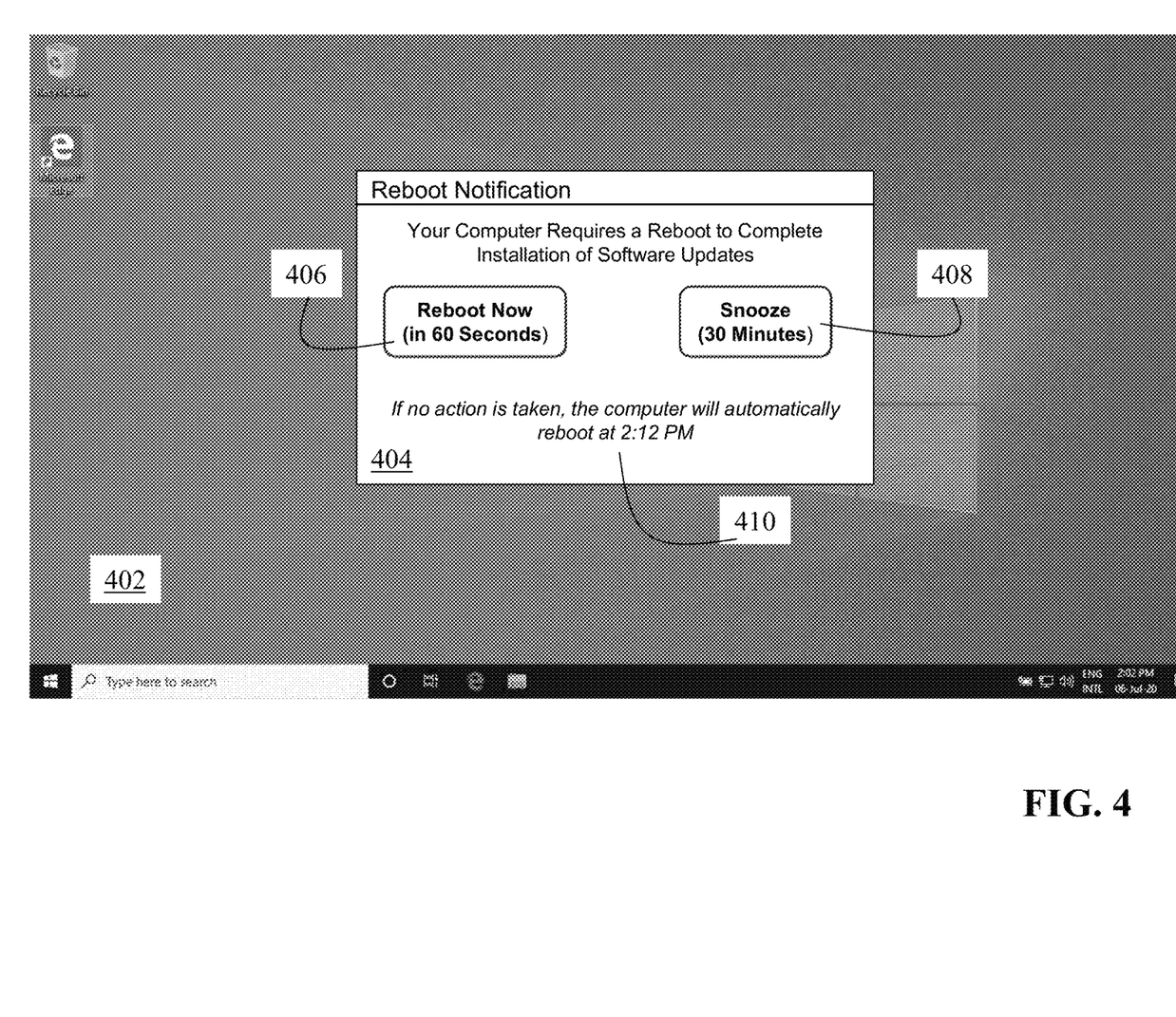
FIG. 4 is a diagram of a first exemplary reboot notification window displayed on top of a hosted virtual desktop application.

Upon determining that a reboot of the client computing device 202 is required, the reboot scheduling module 202b can generate (308) a reboot notification window that is displayed in the display device 203 on top of the hosted virtual desktop application. FIG. 4 is a first exemplary reboot notification window generated by the reboot scheduling module 202b. As shown in FIG. 4, the hosted virtual desktop application window 402 is displayed and the reboot notification window 404 generated by the reboot scheduling module 202b is displayed on top of the HVD application window 402 (including any application windows that are currently being displayed in the context of the HVD application). As such, the user of client computing device 202 can easily and quickly see that a reboot is pending for the device.

Additionally, the reboot notification window 404 includes several user interface elements to enable the user to customize the timing of the scheduled reboot. Button 406 enables the user to execute the scheduled reboot within a very short period of time (e.g., 60 seconds), while button 408 enables the user to delay the scheduled reboot for a predetermined period of time (e.g., 30 minutes). For the latter option, once the delay time has elapsed, the operating system software 202c can execute the reboot instruction as received earlier to complete the reboot of the client computing device 202. Also, in some embodiments, the reboot notification window 404 includes an informational message 410 indicating that the client computing device 202 will automatically reboot at a scheduled time (e.g., 2:12 PM) if the user does not take any action.

Figure 5:
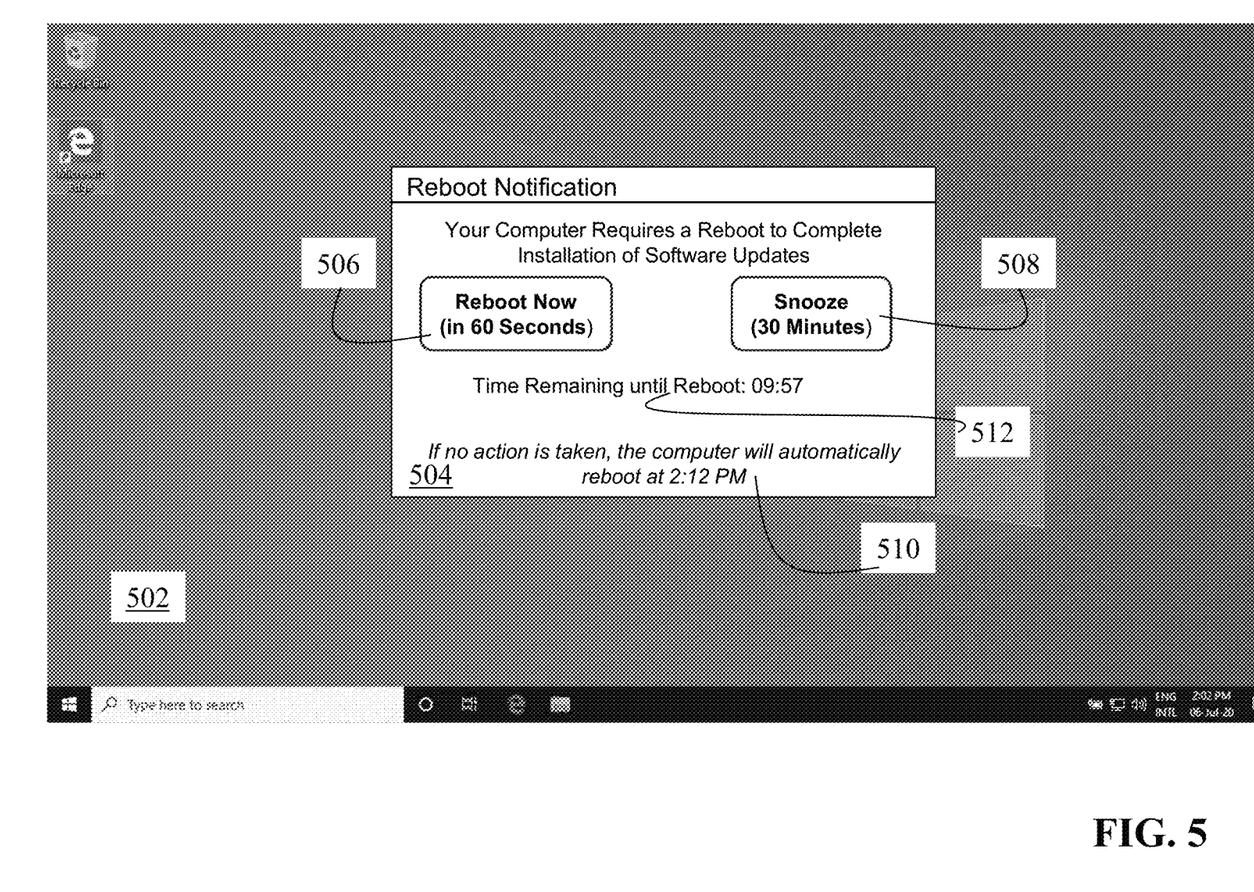
FIG. 5 is a diagram of a second exemplary reboot notification window displayed on top of a hosted virtual desktop application.

FIG. 5 is a second exemplary reboot notification window generated by the reboot scheduling module 202b. As shown in FIG. 5, the hosted virtual desktop application window 502 is displayed and the reboot notification window 504 generated by the reboot scheduling module 202b is displayed on top of the HVD application window 502 (including any application windows that are currently being displayed in the context of the HVD application). As such, the user of client computing device 202 can easily and quickly see that a reboot is pending for the device.

Additionally, the reboot notification window 504 includes several user interface elements to enable the user to customize the timing of the scheduled reboot. Button 506 enables the user to execute the scheduled reboot within a very short period of time (e.g., 60 seconds), while button 508 enables the user to delay the scheduled reboot for a predetermined period of time (e.g., 30 minutes). For the latter option, once the delay time has elapsed, the operating system software 202c can execute the reboot instruction as received earlier to complete the reboot of the client computing device 202. Also, in some embodiments, the reboot notification window 504 includes an informational message 510 indicating that the client computing device 202 will automatically reboot at a scheduled time (e.g., 2:12 PM) if the user does not take any action. Furthermore, the reboot notification window 504 includes a timer 512 which displays the time remaining until the scheduled reboot will be automatically executed by the operating system software 202c.

Figure 6:
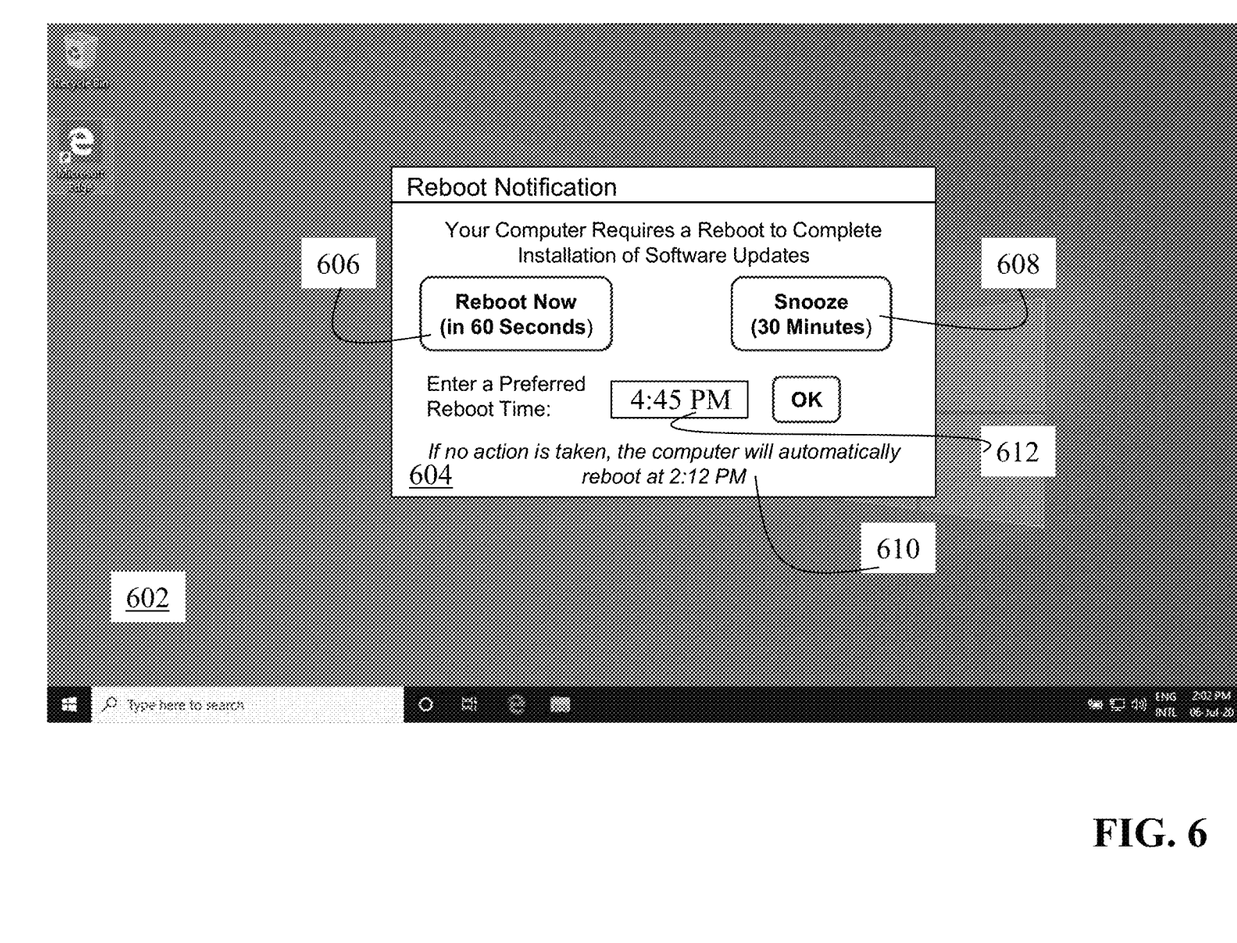
FIG. 6 is a diagram of a third exemplary reboot notification window displayed on top of a hosted virtual desktop application.

FIG. 6 is a third exemplary reboot notification window generated by the reboot scheduling module 202b. As shown in FIG. 6, the hosted virtual desktop application window 602 is displayed and the reboot notification window 604 generated by the reboot scheduling module 202b is displayed on top of the HVD application window 602 (including any application windows that are currently being displayed in the context of the HVD application). As such, the user of client computing device 202 can easily and quickly see that a reboot is pending for the device.

Additionally, the reboot notification window 604 includes several user interface elements to enable the user to customize the timing of the scheduled reboot. Button 606 enables the user to execute the scheduled reboot within a very short period of time (e.g., 60 seconds), while button 608 enables the user to delay the scheduled reboot for a predetermined period of time (e.g., 30 minutes). For the latter option, once the delay time has elapsed, the operating system software 202c can execute the reboot instruction as received earlier to complete the reboot of the client computing device 202. Also, in some embodiments, the reboot notification window 604 includes an informational message 610 indicating that the client computing device 202 will automatically reboot at a scheduled time (e.g., 2:12 PM) if the user does not take any action. Furthermore, the reboot notification window 604 includes a drop down box 612 which enables the user to select a preferred reboot time (e.g., 4:45 PM) which overrides the currently scheduled reboot time. When the user presses the OK button, the reboot scheduling module 202b instructs the operating system software 202c to reschedule the execution of the reboot procedure to the time entered in the notification window 604.

It should be appreciated that in some embodiments, the reboot notification window can include any or all of the variety of features described above with respect to FIGS. 4, 5, and 6. In addition, in some embodiments the reboot scheduling module 202b prevents the reboot notification window from being minimized or closed—thereby requiring the user to take action (or let the reboot occur as scheduled) before the user can return to viewing the full HVD application window.

Turning back to FIG. 3, the reboot scheduling module 202b receives (310) instructions via the reboot notification window (as described above) to execute a scheduled reboot of the client computing device 202. The instructions can comprise a timestamp or other value that indicates the time at which the scheduled reboot will take place. For example, when the user selects the reboot now option, the instructions can comprise a timestamp having a value of 60 seconds from the time that the reboot now option was selected. When the user selects the delay reboot option, the instructions can comprise a timestamp having a value of a predetermined number of minutes (e.g., 30 minutes) from the current time. And, when the user selects a preferred reboot time (e.g., 4:45 PM), the instructions can comprise a timestamp having the entered time value. The reboot scheduling module 202b can provide the timestamp value to the operating system software 202c and instruct the operating system software 202c to reboot the client computing device 202 at the time indicated in the timestamp.

Then, when the operating system software 202c determines that the reboot time has been reached (e.g., by comparing the timestamp value received in the instructions to a clock or other similar value stored in memory), the operating system software 202c executes (312) the scheduled reboot of the client computing device 202. In some embodiments, the operating system software 202c communicates to the server computing device 206 that a reboot has been initiated, which closes the connection between the client computing device 202 and the server computing device 206. Furthermore, in some embodiments the client computing device 202 closes the HVD application window running locally on the client device.

In some embodiments, the functionality of the reboot scheduling module 202b can be adjusted based upon operational characteristics of the client computing device 202. As described previously, the client computing device 202 can initiate the process for determining whether a hardware reboot is required when the device detects a user login request. Depending upon the time that the login request is detected, the operating system software 202c can modify the operation of the reboot scheduling module 202b in determining that a reboot is required. For example, the reboot scheduling module 202b can be instructed to determine whether a reboot is required only if the local time of the client computing device 202 is between a predefined range (e.g., 8:00 am to 11:00 am)—indicating the start of the workday. Otherwise, if the local time is earlier than 8:00 am or later than 11:00 am, the operating system software 202c can forgo the reboot determination process.

In another example, the operating system software 202c can be configured to ensure that the reboot determination process and display of the reboot notification window occurs within a predetermined time (e.g., 5 minutes) of detecting the user login request. In this way, the user is notified of a pending reboot shortly after beginning work, when the reboot is potentially less disruptive than a reboot that occurs in the middle of the day.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks;

magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated management of scheduling a computer hardware reboot, the system comprising a computing device having a memory that stores computer-executable instructions and a processor that executes the computer-executable instructions to:
   detect a user login request;
   launch a hosted virtual desktop application for display on a display device coupled to the computing device;
   determine that a reboot of the computing device is required, including identifying that one or more software application updates have been applied to the computing device during a period of time prior to detecting the user login request;
   generate a reboot notification window that is displayed on top of the hosted virtual desktop application;
   receive instructions via the reboot notification window to execute a scheduled reboot of the computing device; and
   execute the scheduled reboot of the computing device at a time defined in the received instructions.

2. The system of claim 1, wherein the hosted virtual desktop application covers an entire viewing area of the display device.

3. The system of claim 2, wherein other notification windows generated by the computing device are covered by the hosted virtual desktop application, such that the other notification windows are not visible to a user of the computing device.

4. The system of claim 1, wherein the computing device analyzes one or more registry keys of an operating system of the computing device to identify that one or more software application updates have been applied to the computing device during a period of time prior to detection of the user login request.

5. The system of claim 1, wherein the computing device analyzes one or more operating system management instrumentation classes of an operating system of the computing device to identify that one or more software application updates have been applied to the computing device during a period of time prior to detection of the user login request.

6. The system of claim 1, wherein the reboot notification window comprises one or more user interface (UI) input controls that enable a user of the computing device to select a scheduled reboot time of the computing device.

7. The system of claim 6, wherein each of the one or more UI input controls is associated with a different scheduled reboot time.

8. The system of claim 6, wherein receiving instructions via the reboot notification window to execute a scheduled reboot of the computing device comprises detecting a selection of one of the UI input controls by a user of the computing device.

9. The system of claim 8, wherein the reboot notification window comprises a countdown timer that begins counting when the reboot notification window is first generated.

10. The system of claim 9, wherein when the countdown timer reaches zero and a selection of one of the UI input controls is not detected, the computing device executes a reboot of the computing device at a predetermined time.

11. The system of claim 10, wherein the predetermined time is immediately after the countdown timer reaches zero.

12. The system of claim 10, wherein the predetermined time is at least thirty minutes after the countdown timer reaches zero.

13. The system of claim 1, wherein the computing device generates the reboot notification window within a predetermined time period after detecting the user login request.

14. The system of claim 1, wherein the reboot notification window is always visible to a user of the computing device until the instructions to execute a scheduled reboot of the computing device are received.

15. A computerized method of automated management of scheduling a computer hardware reboot, the method comprising:
- detecting, by a computing device, a user login request;
- launching, by the computing device, a hosted virtual desktop application for display on a display device coupled to the computing device;
- determining, by the computing device, that a reboot of the computing device is required, including identifying that one or more software application updates have been applied to the computing device during a period of time prior to detecting the user login request;
- generating, by the computing device, a reboot notification window that is displayed on top of the hosted virtual desktop application;
- receiving, by the computing device, instructions via the reboot notification window to execute a scheduled reboot of the computing device; and
- executing, by the computing device, the scheduled reboot of the computing device at a time defined in the received instructions.

16. The method of claim 15, wherein the hosted virtual desktop application covers an entire viewing area of the display device.

17. The method of claim 16, wherein other notification windows generated by the computing device are covered by the hosted virtual desktop application, such that the other notification windows are not visible to a user of the computing device.

18. The method of claim 15, wherein the computing device analyzes one or more registry keys of an operating system of the computing device to identify that one or more software application updates have been applied to the computing device during a period of time prior to detection of the user login request.

19. The method of claim 15, wherein the computing device analyzes one or more operating system management instrumentation classes of an operating system of the computing device to identify that one or more software application updates have been applied to the computing device during a period of time prior to detection of the user login request.

20. The method of claim 15, wherein the reboot notification window comprises one or more user interface (UI) input controls that enable a user of the computing device to select a scheduled reboot time of the computing device.

21. The method of claim 20, wherein each of the one or more UI input controls is associated with a different scheduled reboot time.

22. The method of claim 20, wherein receiving instructions via the reboot notification window to execute a scheduled reboot of the computing device comprises detecting a selection of one of the UI input controls by a user of the computing device.

23. The method of claim 22, wherein the reboot notification window comprises a countdown timer that begins counting when the reboot notification window is first generated.

24. The method of claim 23, wherein when the countdown timer reaches zero and a selection of one of the UI input controls is not detected, the computing device executes a reboot of the computing device at a predetermined time.

25. The method of claim 24, wherein the predetermined time is immediately after the countdown timer reaches zero.

26. The method of claim 24, wherein the predetermined time is at least thirty minutes after the countdown timer reaches zero.

27. The method of claim 15, wherein the computing device generates the reboot notification window within a predetermined time period after detecting the user login request.

28. The method of claim 15, wherein the reboot notification window is always visible to a user of the computing device until the instructions to execute a scheduled reboot of the computing device are received.

\* \* \* \* \*